US011436297B2

(12) United States Patent
Dzumla et al.

(10) Patent No.: US 11,436,297 B2
(45) Date of Patent: Sep. 6, 2022

(54) LANDING PAGE GENERATION (71) Applicant: LONGTAIL UX PTY LTD, Drummoyne (AU)

(72) Inventors: Andreas Dzumla, Drummoyne (AU); Will Santow, Drummoyne (AU); Pragya Bajracharya, Campsie (AU); Alexia Blum, Drummoyne (AU)

(73) Assignee: LONGTAIL UX PTY LTD, Drummoyne (AU)

( * ) Notice: Subject to any disclaimer, the term of this patent is extended or adjusted under 35 U.S.C. 154(b) by 0 days.

(21) Appl. No.: 16/301,247

(22) PCT Filed: May 12, 2017

(86) PCT No.: PCT/AU2017/000104
§ 371 (c)(1),
(2) Date: Nov. 13, 2018

(87) PCT Pub. No.: WO2017/197430
PCT Pub. Date: Nov. 23, 2017

(65) Prior Publication Data
US 2019/0286682 A1 Sep. 19, 2019

(30) Foreign Application Priority Data

May 18, 2016 (AU) .................... 2016901847

(51) Int. Cl.
*G06F 16/9538* (2019.01)
*G06Q 30/02* (2012.01)
(Continued)

(52) U.S. Cl.
CPC .... *G06F 16/9577* (2019.01); *G06F 16/90332* (2019.01); *G06F 16/90344* (2019.01);
(Continued)

(58) Field of Classification Search
CPC ........... G06F 16/90332; G06F 16/9538; G06F 16/951; G06F 16/9577; G06F 16/90344;
(Continued)

(56) References Cited

U.S. PATENT DOCUMENTS 7,013,323 B1 * 3/2006 Thomas ................. G06Q 30/02
707/999.005
7,730,021 B1 * 6/2010 Morse ................... G06F 16/951
705/64

(Continued)

FOREIGN PATENT DOCUMENTS

WO   WO2007073262   *  6/2007
WO   WO2016/150959     9/2016

OTHER PUBLICATIONS

PCT Search Report and Written Opinion prepared for PCT/AU2017/000104, completed Sep. 7, 2017.
(Continued)

*Primary Examiner* — Scott T Baderman
*Assistant Examiner* — Mario M Velez-Lopez
(74) *Attorney, Agent, or Firm* — Barnes & Thornburg LLP (57) ABSTRACT A system for generating keyword-level landing pages for paid search campaigns associated with website content on a website, the system comprising: a keyword list management module adapted to: receive a set of campaign defined terms, wherein the set of campaign defined terms comprises a plurality of phrases that are actively targeted as SEM keywords in an SEM campaign; a website content gathering module adapted to: receive website content data associated with the website content; a landing page generating module adapted to: retrieve the website content data from the website content gathering module, generate a plurality of landing pages based on the received campaign defined terms and the retrieved website content data; and communicate (Continued)

with a publicly visible web page server to enable the publicly visible web page server to store and serve the generated landing pages.

22 Claims, 7 Drawing Sheets

(51) Int. Cl.
    *G06F 16/957*     (2019.01)
    *G06F 16/9032*     (2019.01)
    *G06F 16/903*     (2019.01)

(52) U.S. Cl.
    CPC ......... *G06F 16/9538* (2019.01); *G06Q 30/02* (2013.01); *G06Q 30/0277* (2013.01); *G06Q 30/0273* (2013.01)

(58) Field of Classification Search
    CPC . G06Q 30/02; G06Q 30/0277; G06Q 30/0273
    See application file for complete search history.

(56) References Cited

U.S. PATENT DOCUMENTS

| | | | |
|---|---|---|---|
| 8,527,341 B2 * | 9/2013 | Feuerstein | G06Q 30/08 705/14.42 |
| 10,534,781 B2 * | 1/2020 | Dzumla | G06F 16/957 |
| 10,719,855 B1 * | 7/2020 | Sears | G06F 16/22 |
| 2005/0038894 A1 * | 2/2005 | Hsu | G06Q 30/0224 709/228 |
| 2007/0027901 A1 | 2/2007 | Chan et al. | |
| 2009/0094137 A1 * | 4/2009 | Toppenberg | G06Q 30/02 707/E17.112 |
| 2009/0171721 A1 * | 7/2009 | LeBaron | G06Q 30/02 705/14.54 |
| 2011/0035367 A1 | 2/2011 | Gupta et al. | |
| 2012/0239488 A1 | 9/2012 | Zimmerman et al. | |
| 2014/0006930 A1 * | 1/2014 | Hollis | G06Q 50/01 715/234 |
| 2014/0108143 A1 * | 4/2014 | Davitz | G06Q 30/0255 705/14.53 |
| 2014/0195893 A1 | 7/2014 | Lei | |
| 2014/0258002 A1 * | 9/2014 | Zimmerman | G06Q 30/0256 705/14.72 |
| 2014/0278985 A1 | 9/2014 | Ramakrishnan et al. | |
| 2015/0081440 A1 * | 3/2015 | Blemaster | G06F 16/951 705/14.54 |
| 2015/0294359 A1 | 10/2015 | Burt et al. | |
| 2016/0232162 A1 * | 8/2016 | Dzumla | G06F 16/951 |

OTHER PUBLICATIONS

Warren, A., "Why You Shouldn't Use Dynamic Landing Pages For PPC," Dec. 11, 2014, Retrieved from Internet, <URL: https ://www.disruptiveadvertising.com/conversion-rate-optimization/dynamic-landing-pages/>.

* cited by examiner

LANDING PAGE GENERATION

CROSS-REFERENCE TO RELATED APPLICATIONS

The present application is the U.S. national phase of PCT/AU2017/000104, filed on May 12, 2017. PCT/AU2017/000104 claims priority to Australian Patent Application Serial No. 2016901847, which was filed on May 18, 2016, the entirety of each of which is hereby incorporated by reference.

TECHNICAL FIELD

The present invention relates to improvements in landing page generation. In particular, the present invention relates to a system, method or server for generating keyword-level landing pages.

BACKGROUND

Web sites are used by entities to advertise their products and services in order to attract customers and increase sales of those products and services. In many cases, potential customers rely on Internet search engines, such as Google™, Yahoo!™, Bing™ etc. to perform keyword searches to find entities that sell certain products or services that they are looking for. In this context, potential customers perform a keyword search using a search engine and either find the products/services in the "organic search listings" ranked by relevance or in the "paid search listings" or "search engine adverts", which are paid adverts displayed by an auction model such as Google AdWords™ or Bing Ads™, for example. In the auction for advert positions, the cost-per-click (CPC) bid is one ranking factor, however relevance is another important ranking factor ('relevance' in the auction formula is quantified as a 'Quality Score', a combination of measured click rate history on an ad relative to its position for a certain keyword as well as predictive factors such as landing page content keyword match, among many others).

It is becoming increasingly important for these entities to have their particular website feature highly in the search results provided by these search engines. While it is highly unlikely that a rank on page 1 in the organic search results can be predicted, due to the fact that search engines keep their organic ranking algorithm secret (in order to avoid specific manipulations of websites to appear high in the organic search results), achieving a page 1 ranking in paid search results is becoming increasingly expensive. This is due to increasing CPCs in the paid search auction due to an increased number of companies and volume of advertising budgets moving online.

In order to keep Cost-per-Acquisition ('CPA'; the cost for the acquisition of a sale or user information enquiries etc.) for Search Engine Marketing (SEM), at bay and to increase return on investment (ROI) from SEM, website owners have been utilising SEM landing page optimisation since the early days of paid search advertising.

The aim of SEM landing page optimisation is to optimize the matching of a potential customer's search query with a landing page that is to be shown to the potential customer, where that landing page is associated with the paid advert.

The effectiveness of landing page optimisation is measured by performance in relation to a 'goal'. The goal can be, for example, a purchase transaction, sale or a 'lead' such as the user submitting an information enquiry form. The higher the goal conversion rate, the lower the Cost-per-Acquisition (CPA), and the higher the ROI for the paid search advertising campaign with everything else being equal.

One challenge for SEM landing page optimisation is to attribute the best matching and best landing page conversion for potentially hundreds of thousands of different customer search queries and the relevant SEM campaign targeted keywords. Current systems tend to lead potential customers onto landing pages that do not fully match the search query, which can lead to a low conversion rate.

Another challenge for SEM landing page optimisation is that for some search queries and key phrases the best matching content is spread out over a number of different existing web pages. Using landing pages that do not fully match the targeted keywords leads to a lower Quality Score. A lower Quality Score requires a higher CPC in the advert auction to achieve the same CPA.

The present invention aims to overcome, or at least alleviate, some or all of the afore-mentioned problems.

Further objects and advantages of the invention will be brought out in the following portions of the specification, wherein the detailed description is for the purpose of fully disclosing the preferred embodiment of the invention without placing limitations thereon.

The background discussion (including any potential prior art) is not to be taken as an admission of the common general knowledge in the art in any country. Any references discussed state the assertions of the author of those references and not the assertions of the applicant of this application. As such, the applicant reserves the right to challenge the accuracy and relevance of the references discussed.

SUMMARY

Various aspects of the present disclosure include a system, method and server for generating web pages as landing pages for SEM, also referred to as search engine advertising (SEA) or 'Paid Search' advertising, to increase conversion rates and decrease CPA for SEM/SEA.

The system, method and server provides for a backend system where web pages may be hosted. A reverse-proxy URL rewrite may serve hosted pages on a website, within one or more of the website's subdomains or one or more of the website's subdirectories to Internet users. Hosted web pages may display content in the form of search results. Search results may be obtained by performing keyword searches against the content in the database.

Database content may include data fed from the website, such as product and service feeds. Generated web pages may be cached and optimized for page load times and conversion rate.

Keyword sets may be manually added, imported via API from SEM platforms or read from referrer URL strings.

Generated web pages may be prevented from being indexed by search crawlers in search engine's organic search indices and so search engine crawlers may be blocked via robot meta tags or robots.txt rules. This is because the landing pages are generated for the purpose of paid search advertising and so are specifically generated as landing pages for SEM adverts.

According to a first aspect, the present disclosure provides a system for generating keyword-level landing pages for paid search campaigns associated with website content on a website, the system comprising: a keyword list management module adapted to: receive a set of campaign defined terms, wherein the set of campaign defined terms comprises a plurality of phrases that are actively targeted as SEM keywords in an SEM campaign; a website content gathering module adapted to: receive website content data associated with the website content; a landing page generating module adapted to: retrieve the website content data from the website content gathering module, generate a plurality of landing pages based on the received campaign defined terms and the retrieved website content data; and communicate with a publicly visible web page server to enable the publicly visible web page server to store and serve the generated landing pages.

According to a second aspect, the present disclosure provides a method for generating keyword-level landing pages for paid search campaigns associated with website content on a website, the method comprising the steps of: receiving a set of campaign defined terms, wherein the set of campaign defined terms comprises a plurality of phrases that are actively targeted as SEM keywords in an SEM campaign, defining keyword-content relationships based on the website content, receiving website content data associated with the website content, retrieving the website content data, generating a plurality of landing pages based on the received campaign defined terms and the retrieved website content data, and communicating with a publicly visible web page server to enable the publicly visible web page server to store and serve the generated landing pages.

According to a further aspect, the present disclosure provides a system for generating web pages for improving conversion rates in SEM/SEA, associated with a website, the system comprising: a keyword list management module adapted to: receive a keyword list or a user search query list from an SEM account, where each keyword and each user search query can be a single keyword or a key phrase comprised of more than one words, via an SEM platform API, via manual upload or from referrer URLs; and where a keyword is a phrase that is actively targeted as a SEM keyword in an SEM campaign, whereas a user search query can be actively targeted by an exact match SEM keyword, or it can be triggered via phrase or broad matching targeted keywords by the SEM platform; define keyword-content relationships; a website content gathering module adapted to receive content data associated with the website content as well as external content related to the website content and keywords; a web page generating module adapted to: retrieve website content data associated with the website content and the external content, and generate web pages based on the received keyword sets and the retrieved website content and external content data; wherein the web page generating module is further adapted to communicate with a publicly visible web page server to enable the publicly visible web page server to store and serve the generated web pages.

According to a further aspect, the present disclosure provides a method for generating web pages for improving conversion rates in SEM/SEA, associated with a website, the method comprising: receiving a keyword list or a user search query list from an SEM account, where each keyword and each user search query can be a single keyword or a key phrase comprised of more than one words, via an SEM platform API, via manual upload or from referrer URLs; and where a keyword is a phrase that is actively targeted as a SEM keyword in an SEM campaign, whereas a user search query can be actively targeted by a SEM keyword, or it can be triggered via phrase or broad matching targeted keywords by the SEM platform; define keyword-content relationships; receiving content data associated with the website content as well as external content related to the website content and keywords; retrieving website content data associated with the website content and the external content, and generating web pages based on the received keyword sets and the retrieved website content and external content data; wherein the web page generating module is further adapted to communicate with a publicly visible web page server to enable the publicly visible web page server to store and serve the generated web pages.

A server arranged to perform the steps of the methods described above is also disclosed. Other aspects are also disclosed including software arranged to perform the steps of the methods described above.

BRIEF DESCRIPTION OF THE DRAWINGS

Embodiments of the present invention will now be described with reference to the drawings and appendices, in which.

DETAILED DESCRIPTION INCLUDING BEST MODE

Where reference is made in any one or more of the accompanying drawings to steps and/or features, which have the same reference numerals, those steps and/or features have for the purposes of this description the same function(s) or operation(s), unless the contrary intention appears.

Computer Description

Figure 1A:
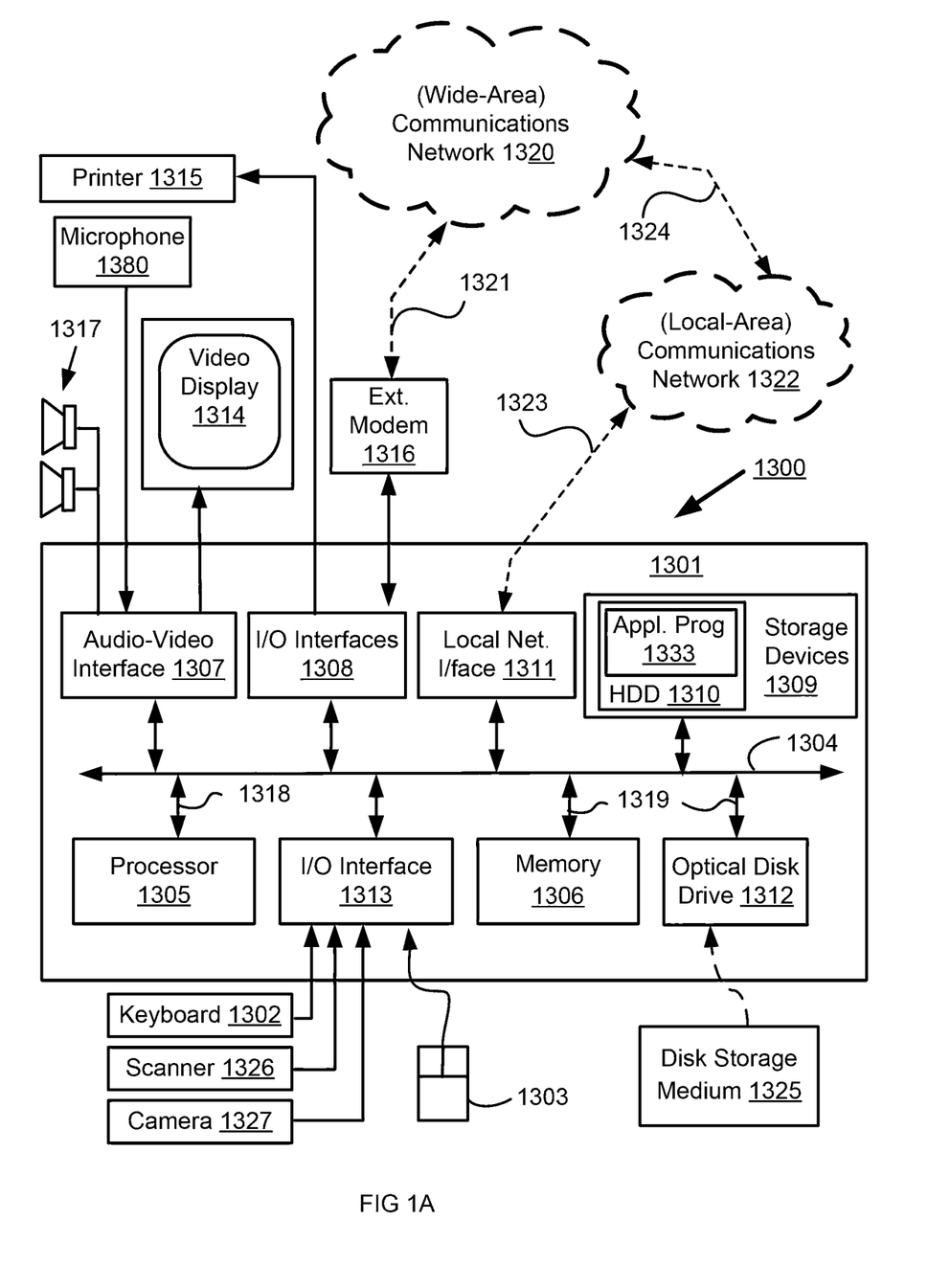
FIGS. 1A and 1B form a schematic block diagram of a general purpose computer system upon which arrangements described can be practiced.
Figure 1B:
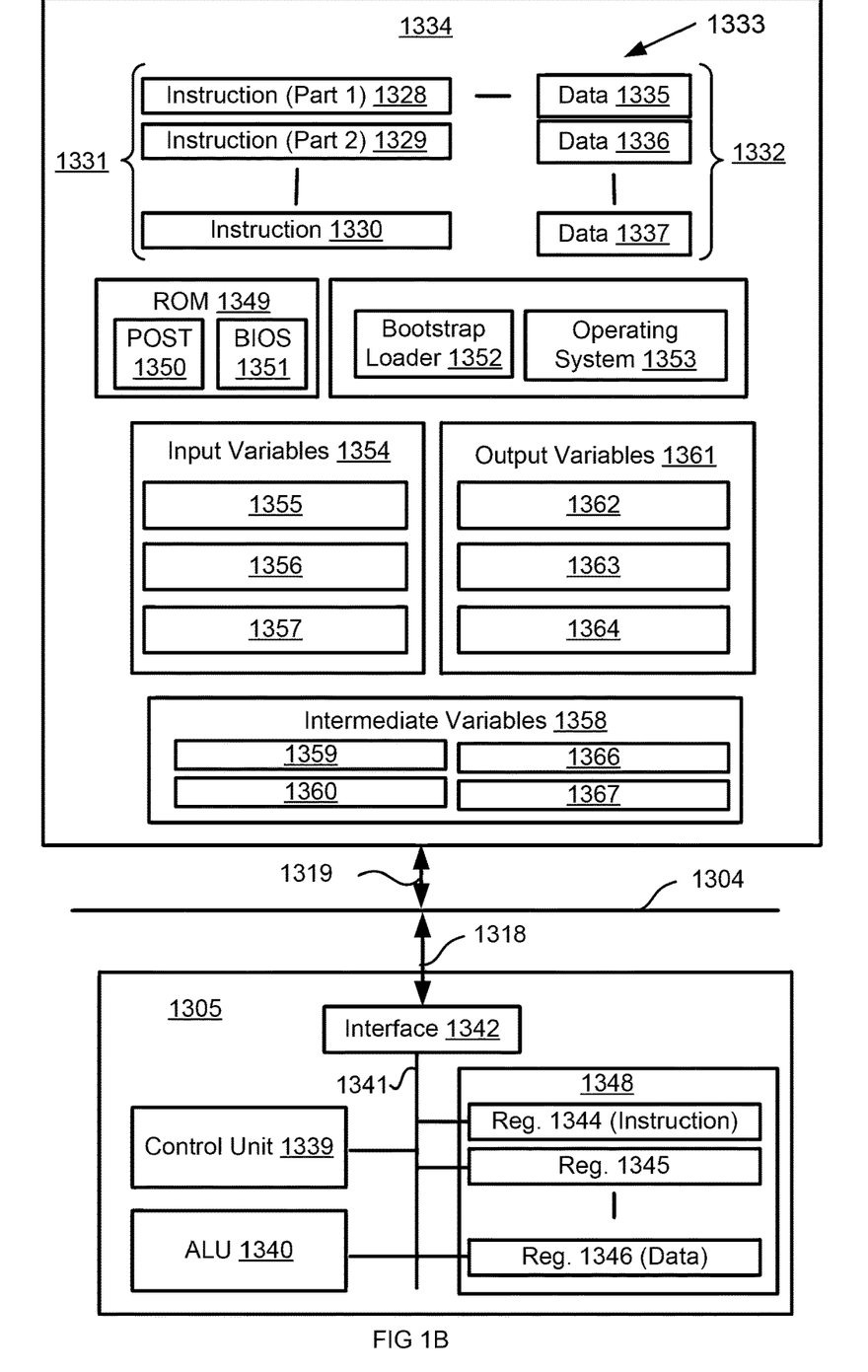

FIGS. 1A and 1B depict a general-purpose computer system 1300, upon which the various arrangements described can be practiced.

As seen in FIG. 1A, the computer system 1300 includes: a computer module 1301; input devices such as a keyboard 1302, a mouse pointer device 1303, a scanner 1326, a camera 1327, and a microphone 1380; and output devices including a printer 1315, a display device 1314 and loudspeakers 1317. An external Modulator-Demodulator (Modem) transceiver device 1316 may be used by the computer module 1301 for communicating to and from a communications network 1320 via a connection 1321. The communications network 1320 may be a wide-area network (WAN), such as the Internet, a cellular telecommunications network, or a private WAN. Where the connection 1321 is a telephone line, the modem 1316 may be a traditional "dial-up" modem. Alternatively, where the connection 1321 is a high capacity (e.g., cable) connection, the modem 1316 may be a broadband modem. A wireless modem may also be used for wireless connection to the communications network 1320.

The computer module 1301 typically includes at least one processor unit 1305, and a memory unit 1306. For example, the memory unit 1306 may have semiconductor random access memory (RAM) and semiconductor read only memory (ROM). The computer module 1301 also includes an number of input/output (I/O) interfaces including: an audio-video interface 1307 that couples to the video display 1314, loudspeakers 1317 and microphone 1380; an I/O interface 1313 that couples to the keyboard 1302, mouse 1303, scanner 1326, camera 1327 and optionally a joystick or other human interface device (not illustrated); and an interface 1308 for the external modem 1316 and printer 1315. In some implementations, the modem 1316 may be incorporated within the computer module 1301, for example within the interface 1308. The computer module 1301 also has a local network interface 1311, which permits coupling of the computer system 1300 via a connection 1323 to a local-area communications network 1322, known as a Local Area Network (LAN). As illustrated in FIG. 1A, the local communications network 1322 may also couple to the wide network 1320 via a connection 1324, which would typically include a so-called "firewall" device or device of similar functionality. The local network interface 1311 may comprise an Ethernet circuit card, a Bluetooth wireless arrangement or an IEEE 802.11 wireless arrangement; however, numerous other types of interfaces may be practiced for the interface 1311.

The I/O interfaces 1308 and 1313 may afford either or both of serial and parallel connectivity, the former typically being implemented according to the Universal Serial Bus (USB) standards and having corresponding USB connectors (not illustrated). Storage devices 1309 are provided and typically include a hard disk drive (HDD) 1310. Other storage devices such as a floppy disk drive and a magnetic tape drive (not illustrated) may also be used. An optical disk drive 1312 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 1300.

The components 1305 to 1313 of the computer module 1301 typically communicate via an interconnected bus 1304 and in a manner that results in a conventional mode of operation of the computer system 1300 known to those in the relevant art. For example, the processor 1305 is coupled to the system bus 1304 using a connection 1318. Likewise, the memory 1306 and optical disk drive 1312 are coupled to the system bus 1304 by connections 1319. Examples of computers on which the described arrangements can be practised include IBM-PC's and compatibles, Sun Sparcstations, Apple Mac™ or like computer systems.

The method of FIGS. 3A, 3B, 4 and 5 may be implemented using the computer system 1300 wherein the processes of FIGS. FIGS. 3A, 3B, 4 and 5, to be described, may be implemented as one or more software application programs 1333 executable within the computer system 1300. In particular, the steps of the method of FIGS. 3A, 3B, 4 and 5 are effected by instructions 1331 (see FIG. 1B) in the software 1333 that are carried out within the computer system 1300. The software instructions 1331 may be formed as one or more code modules, each for performing one or more particular tasks. The software may also be divided into two separate parts, in which a first part and the corresponding code modules performs the processes of FIGS. 3A, 3B, 4 and 5 and a second part and the corresponding code modules manage a user interface between the first part and the user.

The software may be stored in a computer readable medium, including the storage devices described below, for example. The software is loaded into the computer system 1300 from the computer readable medium, and then executed by the computer system 1300. A computer readable medium having such software or computer program recorded on the computer readable medium is a computer program product. The use of the computer program product in the computer system 1300 preferably effects an advantageous apparatus for keyword-level landing page generation.

The software 1333 is typically stored in the HDD 1310 or the memory 1306. The software is loaded into the computer system 1300 from a computer readable medium, and executed by the computer system 1300. Thus, for example, the software 1333 may be stored on an optically readable disk storage medium (e.g., CD-ROM) 1325 that is read by the optical disk drive 1312. A computer readable medium having such software or computer program recorded on it is a computer program product. The use of the computer program product in the computer system 1300 preferably effects an apparatus for keyword-level landing page generation.

In some instances, the application programs 1333 may be supplied to the user encoded on one or more CD-ROMs 1325 and read via the corresponding drive 1312, or alternatively may be read by the user from the networks 1320 or 1322. Still further, the software can also be loaded into the computer system 1300 from other computer readable media. Computer readable storage media refers to any non-transitory tangible storage medium that provides recorded instructions and/or data to the computer system 1300 for execution and/or processing. Examples of such storage media include floppy disks, magnetic tape, CD-ROM, DVD, Blu-ray™ Disc, a hard disk drive, a ROM or integrated circuit, USB memory, a magneto-optical disk, or a computer readable card such as a PCMCIA card and the like, whether or not such devices are internal or external of the computer module 1301. Examples of transitory or non-tangible computer readable transmission media that may also participate in the provision of software, application programs, instructions and/or data to the computer module 1301 include radio or infra-red transmission channels as well as a network connection to another computer or networked device, and the Internet or Intranets including e-mail transmissions and information recorded on Websites and the like.

The second part of the application programs 1333 and the corresponding code modules mentioned above may be executed to implement one or more graphical user interfaces (GUIs) to be rendered or otherwise represented upon the display 1314. Through manipulation of typically the keyboard 1302 and the mouse 1303, a user of the computer system 1300 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 1317 and user voice commands input via the microphone 1380.

FIG. 1B is a detailed schematic block diagram of the processor 1305 and a "memory" 1334. The memory 1334 represents a logical aggregation of all the memory modules (including the HDD 1309 and semiconductor memory 1306) that can be accessed by the computer module 1301 in FIG. 1A.

When the computer module 1301 is initially powered up, a power-on self-test (POST) program 1350 executes. The POST program 1350 is typically stored in a ROM 1349 of the semiconductor memory 1306 of FIG. 1A. A hardware device such as the ROM 1349 storing software is sometimes referred to as firmware. The POST program 1350 examines hardware within the computer module 1301 to ensure proper functioning and typically checks the processor 1305, the memory 1334 (1309, 1306), and a basic input-output systems software (BIOS) module 1351, also typically stored in the ROM 1349, for correct operation. Once the POST program 1350 has run successfully, the BIOS 1351 activates the hard disk drive 1310 of FIG. 1A. Activation of the hard disk drive 1310 causes a bootstrap loader program 1352 that is resident on the hard disk drive 1310 to execute via the processor 1305. This loads an operating system 1353 into the RAM memory 1306, upon which the operating system 1353 commences operation. The operating system 1353 is a system level application, executable by the processor 1305, to fulfil various high level functions, including processor management, memory management, device management, storage management, software application interface, and generic user interface.

The operating system 1353 manages the memory 1334 (1309, 1306) to ensure that each process or application running on the computer module 1301 has sufficient memory in which to execute without colliding with memory allocated to another process. Furthermore, the different types of memory available in the system 1300 of FIG. 1A must be used properly so that each process can run effectively. Accordingly, the aggregated memory 1334 is not intended to illustrate how particular segments of memory are allocated (unless otherwise stated), but rather to provide a general view of the memory accessible by the computer system 1300 and how such is used.

As shown in FIG. 1B, the processor 1305 includes a number of functional modules including a control unit 1339, an arithmetic logic unit (ALU) 1340, and a local or internal memory 1348, sometimes called a cache memory. The cache memory 1348 typically includes a number of storage registers 1344-1346 in a register section. One or more internal busses 1341 functionally interconnect these functional modules. The processor 1305 typically also has one or more interfaces 1342 for communicating with external devices via the system bus 1304, using a connection 1318. The memory 1334 is coupled to the bus 1304 using a connection 1319.

The application program 1333 includes a sequence of instructions 1331 that may include conditional branch and loop instructions. The program 1333 may also include data 1332 which is used in execution of the program 1333. The instructions 1331 and the data 1332 are stored in memory locations 1328, 1329, 1330 and 1335, 1336, 1337, respectively. Depending upon the relative size of the instructions 1331 and the memory locations 1328-1330, a particular instruction may be stored in a single memory location as depicted by the instruction shown in the memory location 1330. Alternately, an instruction may be segmented into a number of parts each of which is stored in a separate memory location, as depicted by the instruction segments shown in the memory locations 1328 and 1329.

In general, the processor 1305 is given a set of instructions which are executed therein. The processor 1305 waits for a subsequent input, to which the processor 1305 reacts to by executing another set of instructions. Each input may be provided from one or more of a number of sources, including data generated by one or more of the input devices 1302, 1303, data received from an external source across one of the networks 1320, 1302, data retrieved from one of the storage devices 1306, 1309 or data retrieved from a storage medium 1325 inserted into the corresponding reader 1312, all depicted in FIG. 1A. The execution of a set of the instructions may in some cases result in output of data. Execution may also involve storing data or variables to the memory 1334.

The disclosed keyword-level landing page generation arrangements use input variables 1354, which are stored in the memory 1334 in corresponding memory locations 1355, 1356, 1357. The keyword-level landing page generation arrangements produce output variables 1361, which are stored in the memory 1334 in corresponding memory locations 1362, 1363, 1364. Intermediate variables 1358 may be stored in memory locations 1359, 1360, 1366 and 1367.

Referring to the processor 1305 of FIG. 1B, the registers 1344, 1345, 1346, the arithmetic logic unit (ALU) 1340, and the control unit 1339 work together to perform sequences of micro-operations needed to perform "fetch, decode, and execute" cycles for every instruction in the instruction set making up the program 1333. Each fetch, decode, and execute cycle comprises:

a fetch operation, which fetches or reads an instruction 1331 from a memory location 1328, 1329, 1330;

a decode operation in which the control unit 1339 determines which instruction has been fetched; and an execute operation in which the control unit 1339 and/or the ALU 1340 execute the instruction.

Thereafter, a further fetch, decode, and execute cycle for the next instruction may be executed. Similarly, a store cycle may be performed by which the control unit 1339 stores or writes a value to a memory location 1332.

Each step or sub-process in the processes of FIGS. 3A, 3B, 4 and 5 is associated with one or more segments of the program 1333 and is performed by the register section 1344, 1345, 1347, the ALU 1340, and the control unit 1339 in the processor 1305 working together to perform the fetch, decode, and execute cycles for every instruction in the instruction set for the noted segments of the program 1333.

The following description provides specific examples of a system, server and method for generating keyword-level landing pages for improving paid search conversion rates associated with an original website. The web pages may be generated and hosted by a third party, and served through the original website server via a subdomain of the original website that points to the IP address of the server or via a subdirectory displaying the server content with a reverse proxy URL rewrite. However, it will be understood that the owner of the original website may also host the keyword-level landing pages. The web pages are generated in such way as to provide higher traffic conversion rates by way of providing closest matching content for each keyword/search query targeted through SEM adverts, i.e. based on campaign defined terms.

The conversion rates are improved by creating or generating web pages from SEM keyword sets (campaign defined terms) that are associated with a SEM campaign, creating one landing page for each keyword in the SEM campaign, matching the keyword against the product and/or services that are offered via the original website as well as, if applicable, relevant external content matching the keyword.

In summary, the system includes one or more processors, one or more memory devices or an interface for connection to one or more memory devices, input and output interfaces for connection to external devices in order to enable the system to receive and operate upon instructions from one or more users or external systems, a data bus for internal and external communications between the various components, and a suitable power supply. Further, the system may include one or more communication devices (wired or wireless) for communicating with external and internal devices, and one or more input/output devices, such as a display, pointing device, keyboard or printing device.

The one or more processors are arranged to perform the steps of one or more programs stored as program instructions within the memory device. The program instructions enable the various methods of performing the invention as described herein to be performed. The program instructions may be developed or implemented using any suitable software programming language and toolkit, such as, for example, a C-based language and compiler. Further, the program instructions may be stored in any suitable manner such that they can be transferred to the memory device or read by the one or more processors, such as, for example, being stored on a computer readable medium. The computer readable medium may be any suitable medium for tangibly storing the program instructions, such as, for example, solid state memory, magnetic tape, a compact disc (CD-ROM or CD-R/W), memory card, flash memory, optical disc, magnetic disc or any other suitable computer readable medium. It will be understood that program instructions may also be made available from a server accessible via the Internet (i.e. in the "cloud"). In this way, all components of the system may be located within and accessible from the "cloud".

The system may also be arranged to be in communication with external data storage systems or devices in order to retrieve the relevant data.

It will be understood that the system herein described includes one or more elements or modules that are arranged to perform the various functions and methods described. The following portion of the description is aimed at providing the reader with an example of a conceptual view of how various modules and/or engines that make up the elements of the system may be interconnected to enable the functions to be implemented. Further, the following portion of the description explains in system related detail how the steps of the herein described method may be performed. The conceptual diagrams are provided to indicate to the reader how the various data elements are processed at different stages by the various different modules and/or engines. It will be understood that the different modules or engines may be located in any number of different places separately or together, such as in a server accessible via the Internet (i.e. in the "cloud") or located on one or more desktop computing systems.

It will be understood that the arrangement and construction of the modules or engines may be adapted accordingly depending on system and user requirements so that various functions may be performed by different modules or engines to those described herein, and that certain modules or engines may be combined into single modules or engines or the functions of the herein described modules or engines may be separated out into different modules or engines.

It will be understood that the modules and/or engines described may be implemented and provided with instructions using any suitable form of technology. For example, the modules or engines may be implemented or created using any suitable software code written in any suitable language, where the code is then compiled to produce an executable program that may be run on any suitable computing system.

Alternatively, or in conjunction with the executable program, the modules or engines may be implemented using any suitable mixture of hardware, firmware and software. For example, portions of the modules may be implemented using an application specific integrated circuit (ASIC), a system-on-a-chip (SoC), field programmable gate arrays (FPGA) or any other suitable adaptable or programmable processing device.

Figure 2:
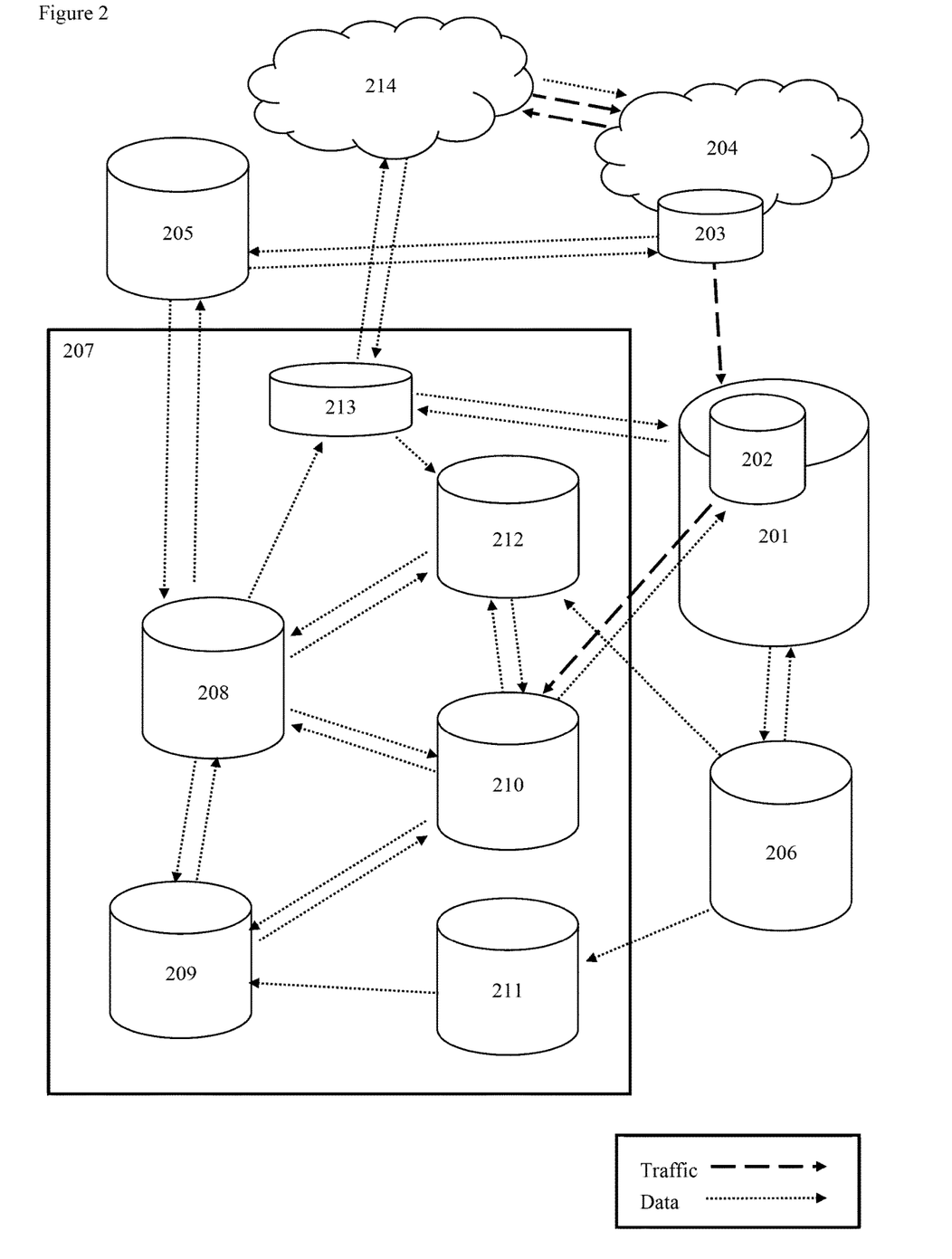
FIG. 2 shows a keyword-level landing page generating system and flow process according to an embodiment of the present invention.

FIG. 2 shows a general system block diagram. An original website is hosted in a client server 201 of a client, with a reverse-proxy URL rewrite module 202. An external (back end) system 207 has a publicly visible web server 210 that is visible to users and search engine advertising (SEA) systems, such as Google AdWords™, for example. It will be understood that there may be multiple web servers 210.

The external (back end) system 207 also has a keyword list management module 208 to receive SEM keyword lists and define keyword-to-content relationships, a product content database 211 to receive product, services and category content associated with the original website via a content feed from the website product content database 206, a content indexing search module 209, a non-product content database 212 for storing all other data provided by the client (e.g. store information, opening hours etc.) as well as any additional, relevant data that the system finds elsewhere and uses for generating the landing pages (e.g. location data, maps, any public available relevant statistics, news data etc.), and a web crawler 213.

Existing keyword visitor traffic passes from the search engine 204 via a paid advert from a search advert listing database 203 to the client website hosted on the client server 201. Whenever a URL request from a paid advert via a search advert listing database 203 matches a pre-defined URL rule (e.g. a subdirectory or subdomain) stored in the reverse proxy URL rewrite module 202, the URL rewrite module 202 serves the page content for this URL from the publicly visible web server 210 rather than from the client server 201.

When a potential customer searches for a particular product or website, one or more keywords are chosen to produce a keyword phrase, or keyword set. It will be understood that a keyword set may include one or more keywords. An example of a keyword set is "{product name} with {product specification 1} and {product specification 2} in {city}". A potential customer can click on a natural search result, or a search advert. As shown in FIG. 2, keyword phrase traffic from search adverts occurs between the search advert listing database 203 and the client website hosted on the client server 201. As described in more detail in FIG. 3, which shows a general process flow diagram, the system as shown in FIG. 2 performs a number of steps and processes to optimise keyword-level landing pages associated with the client website hosted on the client server 201 for better keyword matching content and higher conversion rates.

The SEM keyword list management module 208 obtains or retrieves a number of keyword sets, where each keyword set includes one or more keywords, that are associated with the SEM account stored on the SEM account server 205 associated with the client website hosted on the client server 201. The SEM keywords in these sets are then stored in the keyword list management module 208. These stored keywords are used to develop additional externally hosted web pages. That is, the keyword sets are retrieved from SEM platforms such as Google Adwords™, and imported via API, CSV upload, individual upload, referrer URL analysis from web analytics tools or via manual entry of keywords. It will be understood that other tools may also be used, such as webmaster tools, search query reports, Adwords keywords tools etc, to identify further keywords and search queries.

The keyword list management module 208 performs a number of different processes, as described in detail herein. For example, it enables landing pages to be produced for each keyword from product search results associated with the website indexed in the content indexing search module 209. Further, it enables landing pages to be produced from external relevant content stored in the non-product database 212. This potentially improves landing page conversion rates for traffic associated with the client SEM adverts from search advert listing database 203 and client website hosted on the client server 201. Search results are obtained by requesting keyword matching content via the content indexing search module 209 and analysing those search results to determine the content quality within landing pages in the landing page set.

In other words, the keyword list management module 208 produces a single landing page for each keyword. Content for the landing page comes from a client product and category feed from the product content database 211, which is indexed in the content indexing search module 209. This content is indexed to enable it to be more easily searched against the keywords, i.e. to produce better search results for each landing page.

Non-product content from the client (such as store location information) as well as external relevant content (such as statistics, news etc.) may be obtained from non-product content database 212 to enable more keyword relevant content to be added to the landing pages.

The landing pages are then used as keyword-level landing pages in the SEM account server 205 for the SEM adverts in the search advert listing database 203.

The landing pages hosted on the server 210 are shown to users clicking on the search adverts from the search advert listing database 203 on URLs from the client website 201 via the reverse proxy URL module 202.

To ensure the content quality of each keyword for each landing page in the landing page set, a set of rules are applied by the keyword list management module 208 to measure the keyword-to-content match score on each landing page, compare the measured keyword-to-content match score with a defined threshold and generate an alert if the match score is determined to be lower than the defined threshold.

Once the content quality analysis is complete, the landing pages for a keyword set are provided (or fed) to the web page generating module in the publicly visible web server 210 and the keyword list including the keyword-level SEM landing pages is provided (or fed) to the client SEM account stored on the SEM account server 205.

The web page generating module in the publicly visible web server 210 obtains or retrieves website content data (client content feed) in the form of product, service or category descriptions and details provided by or fed from the client website hosted on the client server 201 or website product content database 206. Further, the web page generating module in the publicly visible web server 210 can also communicate with the non-product content database 212 in order to receive relevant non-product content data, such as, for example, location keywords, relevant store location content, shipping and delivery options and cost information etc.

The client provides the website content (including product feed details) from the website product content database 206 in any suitable format, such as CSV or XML data formats. Alternatively, the website content (including the product feed) may be provided as a CSS feed or via an API. This content feed is fed from the client's database 206 to the product content database 211 and indexed in the content indexing search module 209.

Non-product related client website data, such as store location addresses and opening hours, shipping information by geo location etc., can be provided in a variety of formats, such as CSV or XML data formats, as CSS or via an API, from the website product content database 206 to the non-product database 212.

Non-product related client website and external data can also be added via manual input, CSV, XML, RSS feed or API, or by a web crawler 213 from external websites or databases in the World Wide Web 214.

The product data provided by the website is stored in the product content database 211 and indexed in the content indexing search module 209 to enable internal search results to be generated using target keywords to search the content feed. The landing page content can be enhanced for conversion rate optimization by adding relevant non-product content, as well as content from external sources stored in database 212 to the web page stored on web page generating module in the publicly visible web server 210.

In other words, the generated landing pages are effectively a number of internal search results performed on the in the content indexing search module 209 against the website content using the SEM keywords. In some cases, the landing pages may contain additional keyword relevant content from client non-product content and external sources.

Additional information can be added to the product content database 211 to assist with producing the web pages. For example, product tagging enables particular products to be grouped together by way of defined categories. By defining additional categories, landing page content may be further optimized to match keywords more closely for a higher conversion rate.

The keyword list management module 208 generates keyword-level landing pages on the web page generating module in the publicly visible web server 210 based on the SEM keyword lists, website content data fed from the website product content database 206 and non-product keyword related content in the non-product content database 212. Each landing page generated is associated with a specific keyword set.

The keyword-level landing pages are generated and cached server-side on the web page generating module in the publicly visible web server 210 with the keyword list management module 208. Keyword-level landing pages are re-cached every time the client's content feed (from the website product content database 206) is updated. The cached content is then provided to the client's website hosted on the client web server 201 each time visitors to the website request the content. This server side caching ensures faster page load times so that when a user loads a keyword landing page, there is no new query run against the website product content database 206. Instead, a cached, static HTML page is provided. Regular re-caching is important to ensure freshness of content and to include new products/services available from the website product content database 206 since the last server side cache.

The keyword-level landing pages are designed in a manner so that they look like the client's original webpages, using their CSS and parts of their HTML. This process is performed when designing and/or adapting external keyword landing pages to a client's website and provides seamless user experience, low bounce rates and high conversion rates.

There are two ways keyword-level landing pages can be displayed under original client domain URLs to users and search engines: subdomain and subdirectory. If the client chooses the keyword-level landing pages to be shown to users and search engines through the URLs on a subdomain of the top level domain, then the client delegates a subdomain of the top level domain to the keyword-level landing pages and points it to the IP address of the web page generating module in the publicly visible web server 210.

If the client chooses the keyword-level landing pages to be shown to users and search engines via the URLs of a subdirectory, or another unique URL pattern on their main domain, then the client assigns a sub-directory to the keyword-level landing pages and installs a reverse-proxy URL rewrite for that sub-directory to display the webpage content from the corresponding keyword-level landing page domain URLs.

The generated keyword-level landing pages are produced, cached and hosted on the web page generating module in the publicly visible web server 210 displayed to SEM advert traffic and users via a subdomain or sub-directory of the client website as described. This web page generating module in the publicly visible web server 210 and its stored keyword-level landing pages are publicly visible via the SEM adverts from the search advert listing database 203 on search engine 204 as well as via direct URL requests from direct traffic.

The keyword list management module 208 runs the SEM keyword sets from the client SEM account stored on the SEM account server 205 against the product and/or content feeds from the client in the product content database 211 and the external keyword related data in the non-client data tables 212. That is, product content is selected for each keyword landing page. To identify the product content, the SEM keywords are searched against or compared with the indexed product content available in the content indexing search module 209. The keyword set is then used to produce optimised website landing pages in the form of product search results pages. The keyword list management module 208 also allows modification of the keyword-to-content matching rules. For example, the modifications may include management of synonyms, stop words and negative keywords and the results ranking algorithms (e.g. Word count, Okapi BM25, Proximity search etc.), rules for when and how to include non-product or non-client data from non-client data tables 212, changes to manual or scheduled updates and re-caching to include product feed content updates in generated landing pages. The SEM account server 205 is part of the SEM account system that includes the server and an SEM advert and keyword database.

Figure 3:
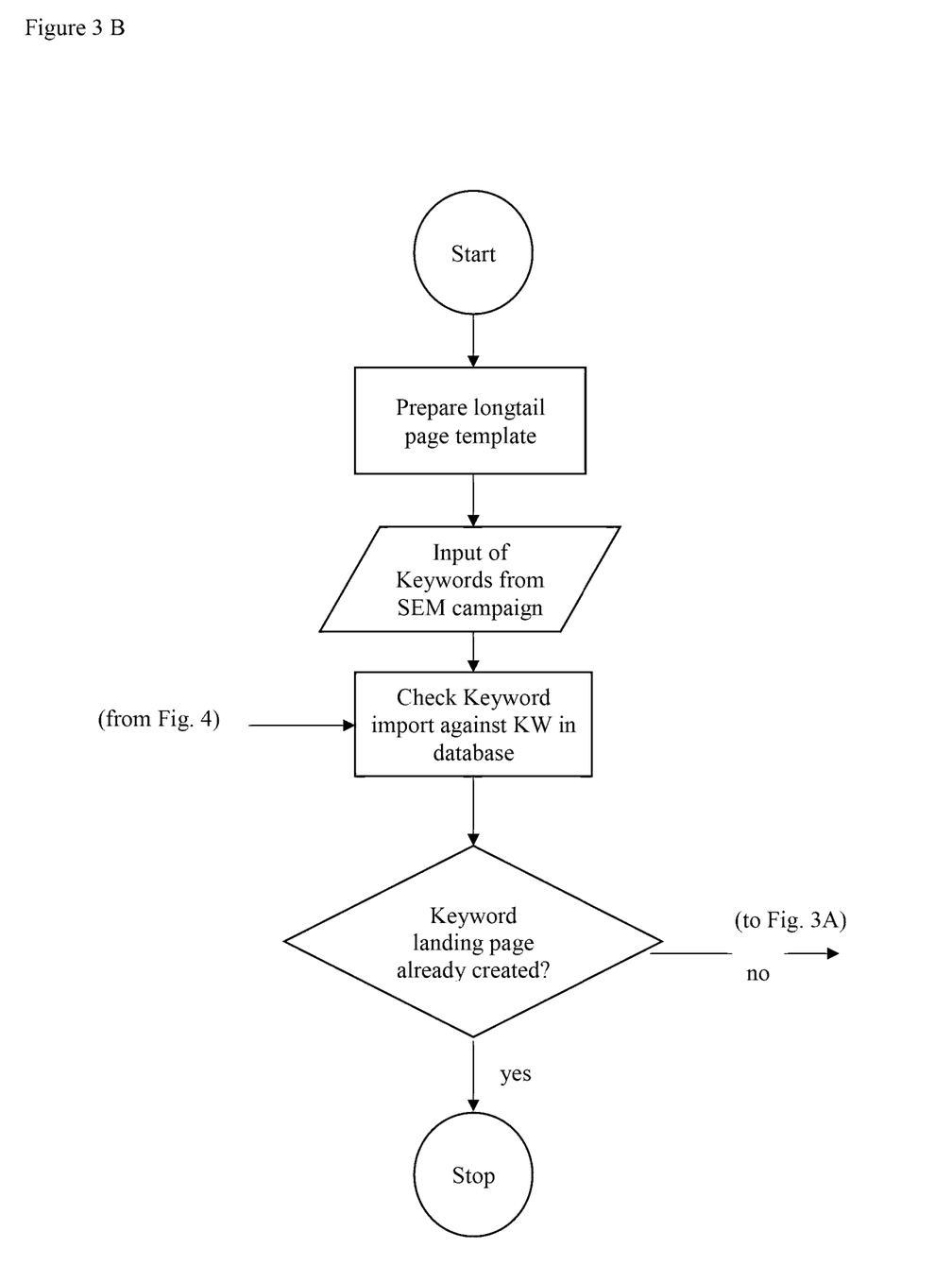
FIGS. 3A and 3B show a general process flow diagram for SEM keyword-level landing page generation according to an embodiment of the present invention.
Figure 3A:
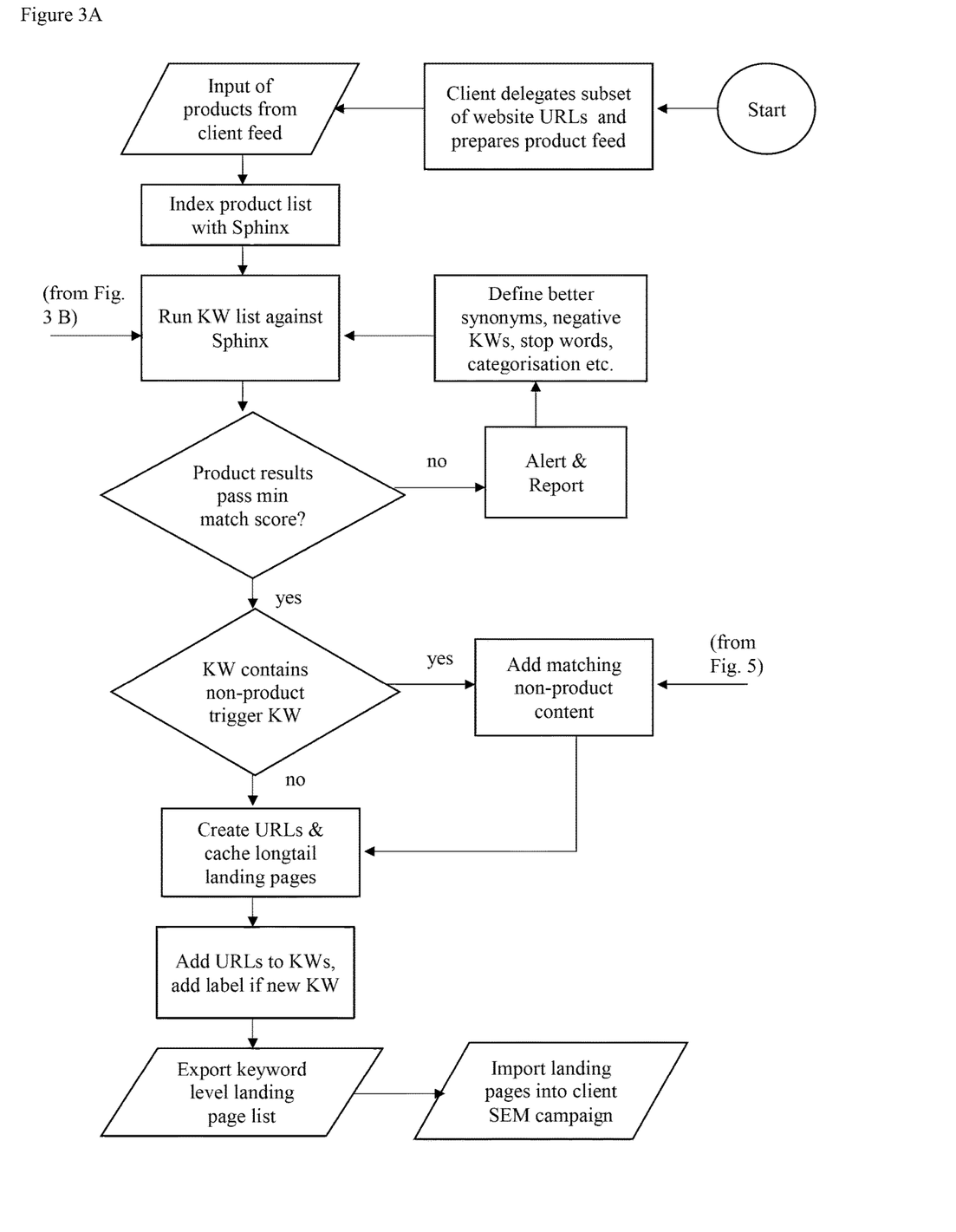

The general process shown in FIG. 3A starts by preparing a keyword landing page template and retrieving keyword lists from the SEM campaign(s) in SEM account server 205. A check is performed to see whether a keyword imported from the SEM campaigns is already present in the keyword list management module 208 from a previous upload. If an imported keyword is present in keyword list management module 208, the system determines that a SEM keyword-level landing page has already been generated and exists. If the system determines that the keyword-level landing page has not previously been created (as an imported keyword is not present), then the keyword is run against, i.e. searched against or compared with, the client product list in the Search appliance (e.g. Sphinx Search).

The general process shown in FIG. 3B starts by the URL rewrite module 202 on the client side delegating a subset of URLs (e.g. Subdomain, subdirectory or other unique URL format) with a reverse proxy URL rewrite and by preparing a product feed that is sent to the product content database 211 for import and indexation in the content indexing search module 209 (e.g. Sphinx Search).

The imported keywords from the SEM campaign that do not already exist in the system are run against, i.e. searched against or compared with, the product lists in the search appliance, and the results are scored whether they have passed a minimum 'keywords to product results' score. For example, the first 3 results on a landing page are looked at, and the system counts how often the keywords appear. The threshold can then be defined as a % value, calculated from the sum of keyword occurrences in the title of the first 3 results divided by the maximum number of keyword occurrences in the first 3 results (e.g. if a key phrase has 4 words, the maximum number of occurrences would be 12 in the titles of the top 3 results; a threshold of 75% would mean that there have to be a minimum of 8 keyword occurrences in the first 3 results, in order for that landing page to pass the 'keywords to product results' score). A further option is to use a threshold number of the scores based on the individual algorithm used for results ranking. For example, each keyword algorithm used in the content indexing search module 209 to produce the product results produces different type of scores for each results, where these scores are used to rank the keywords.

If the keyword list management module 208 determines that the score for the keyword-to-content match is below a pre-defined threshold, then the keyword list management module 208 creates a report so content matching and ranking algorithms can be adapted, additional synonyms, negative keywords, stop words can be added or keyword categorization can be optimized by the keyword list management module 208.

If the keyword list management module 208 determines that the product results pass or exceed the match score threshold, then a check is performed by the keyword list management module 208 to determine whether the keyword contains any non-product content triggers, e.g. a location word. If the keyword list management module 208 determines that a keyword contains a non-product content triggers, then matching non-product content is added to the keyword-level landing page by the keyword list management module 208. E.g. in the case of the keyword containing a location word as non-product content trigger, then relevant store location or delivery rate information can be shown on the keyword-level landing page.

The keyword-level landing page is then stored on the web page generating module of the web server 210 with unique keyword matching URL, and cached for optimal page load times.

The keyword-level landing page URL is then added to the list of keywords by the keyword list management module 208, an automated label can be added according to different rules (e.g. date of creation), the list of keywords and matching keyword-level landing pages are exported from the system 207 and imported into the client SEM campaigns.

Figure 4:
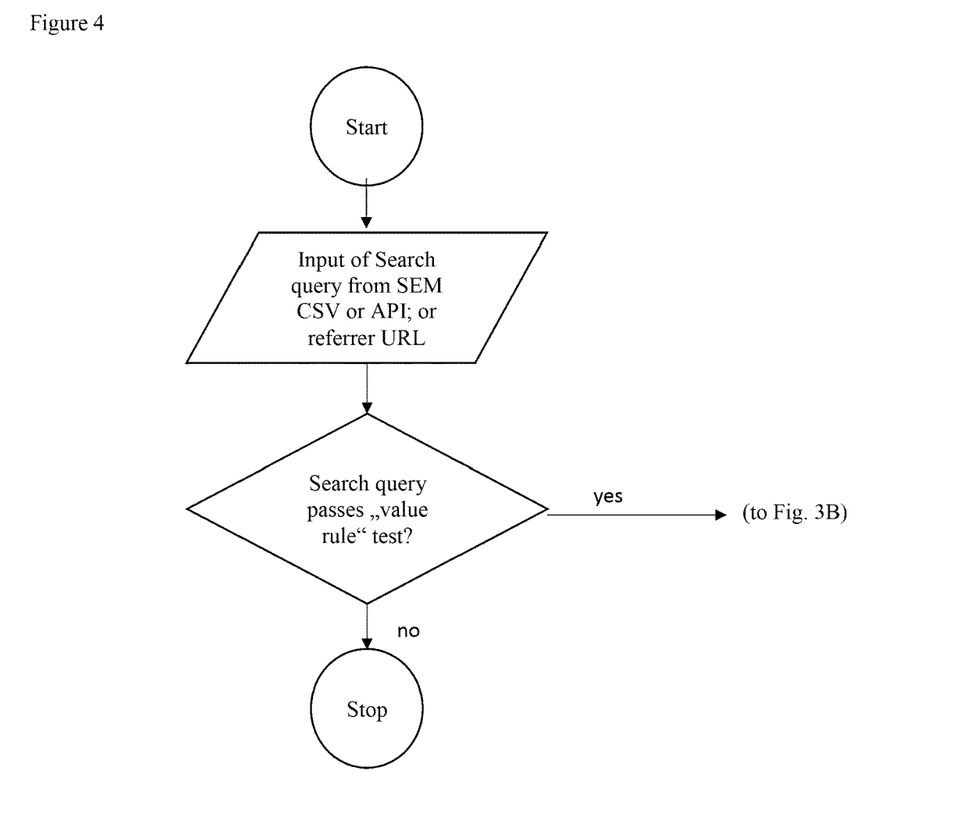
FIG. 4 shows a flow diagram for a keyword expansion process for SEM queries according to an embodiment of the present invention.

The general process shown in FIGS. 3A and 3B can be enhanced by a keyword expansion process shown in FIG. 4. This additional process starts with the input of search queries from the SEM account, either via manual upload, API integration or reading the search query information from the referrer URL string.

A test is performed by the keyword list management module 208 to determine whether the search phrase delivers valuable enough traffic to target the search phrase with an exact match keyword and a corresponding landing page. In order to determine the value of the search query, a "value threshold" test is performed. This value threshold is defined in the keyword list management module 208 and can be defined e.g. as a maximum bounce rate percentage, a minimum time-on-site or pages per session value, or a minimum conversion rate percentage. If the keyword list management module 208 determines that the search query does not pass the defined threshold, then the search query is discarded and this sub-process stops.

If the keyword list management module 208 determines that the search query passes the threshold, then the keyword list management module 208 passes the search query to the SEM keyword-level landing page creation process described in FIG. 3B. A label is added to the keyword list discussed with reference to FIGS. 3A and 3B, such as 'new from search query', before uploading the new keyword and corresponding keyword landing page with the other landing pages into the client's SEM account server 205 so the client has this information available in the SEM campaigns once the new keyword lists and landing pages are re-uploaded into the SEM account.

Figure 5:
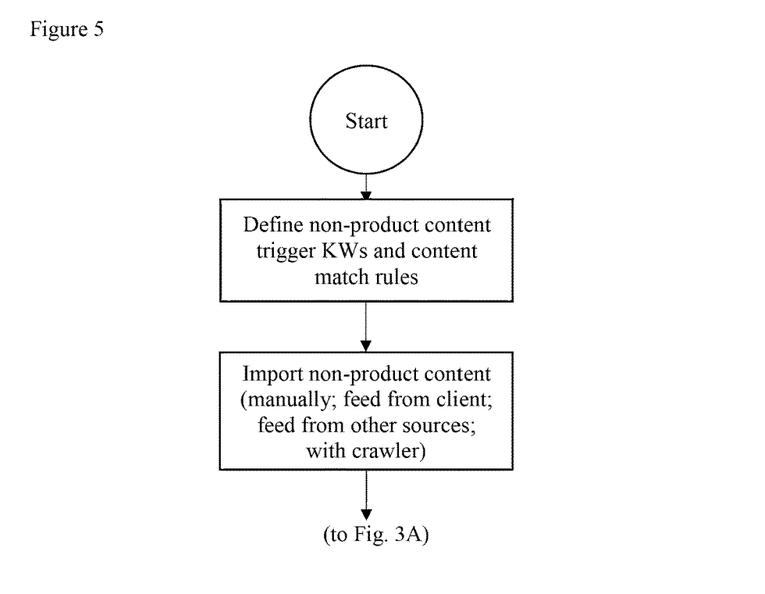
FIG. 5 shows a flow diagram for a non-product content addition process according to an embodiment of the present invention.

The general process shown in FIGS. 3A and 3B can be further enhanced by a non-product content addition process as shown in FIG. 5.

This additional process starts with the definition of non-product content sources, keyword trigger rules, keyword landing page template section and characteristics. Subsequently, the process imports the non-product content, via manual upload, client feed, feed from other sources or via web crawler. The non-product content is then used in the process described in FIG. 3A, when the keywords are tested for non-product keyword triggers.

In other words, keyword lists are retrieved from the client's SEM account server 205, to enable the system to determine if there are any patterns where there is a significant amount of traffic that meets content gaps in order to import additional non-product content.

Figure 6:
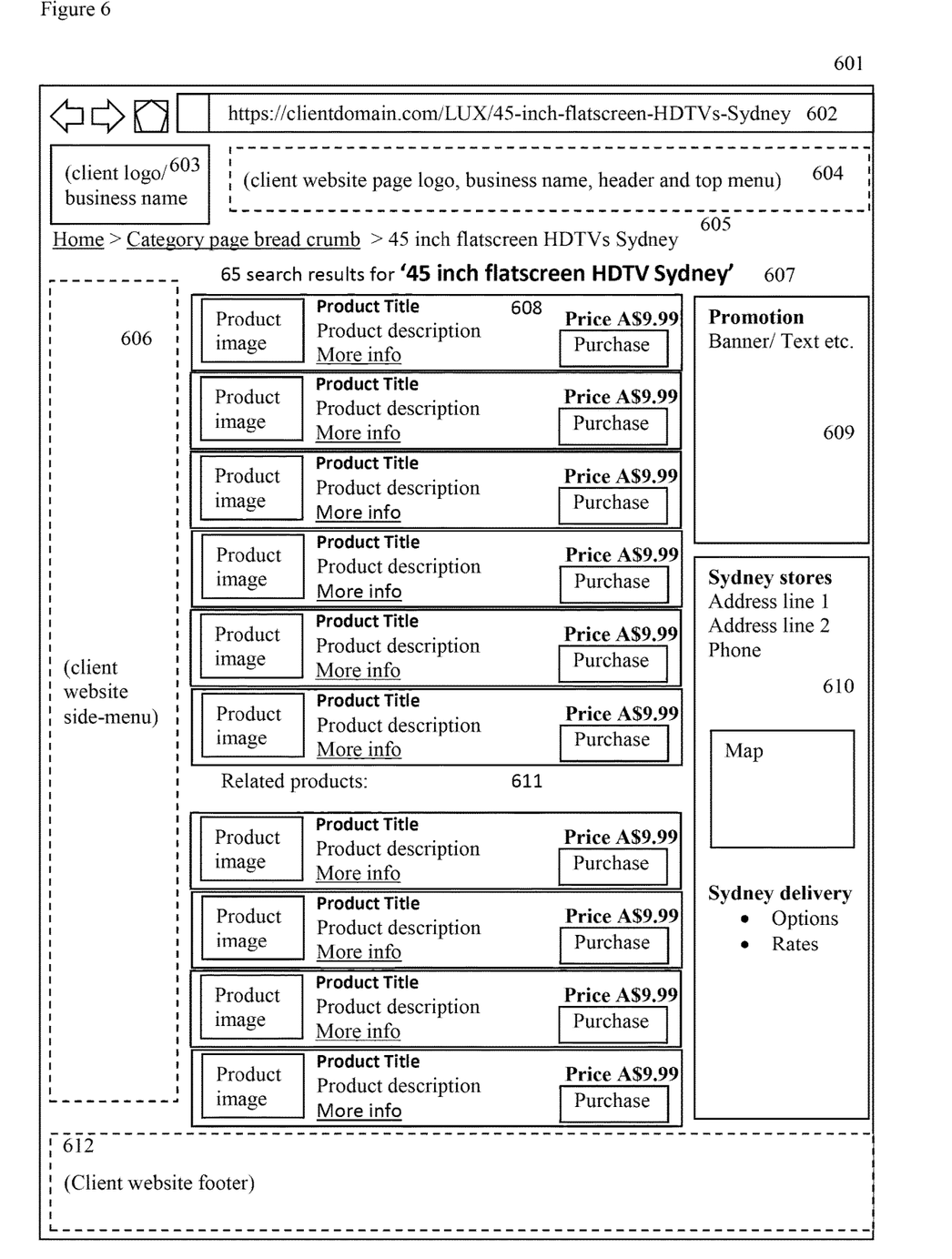
FIG. 6 shows an example of a landing page generated according to an embodiment of the present invention.

FIG. 6 shows an example of a keyword-level landing page 601 generated by the system 207 described herein, and in particular by the web page generating module of the web server 210. The keyword-level landing page has a user friendly URL 602 that identifies the IP address of the client web server 201 and the client website domain or subdomain. The URL also includes at least some, if not all of the words in the SEM keyword. The keyword-level landing page shows search results based (at least partly) on the keywords entered by a prospective customer in the search engine 204 that triggers the SEM advert from the search advert listing database 203.

The client's logo and/or business name 603 are displayed. Various sections of the keyword landing page are allocated for the display of various data and links, such as breadcrumb links 605, product links, client website top menu 604, client website side-menu and/or product list refine-by navigation 606, client website footer 612, all of which serve the purpose of full visual and navigational integration with the existing client website 201 for the user.

In another section 608, the main search results are provided based on full matches from the content indexing search module 209 to the SEM keywords or search queries provided by the SEM campaigns on the SEM account server 205. That is, full matching means matching all words in the keyword set, according the search ranking algorithm used in the content indexing search module 209. In another section 611, related results are provided based on search results that are related to the search terms provided by the prospective customer to the search engine 204. In the main and related search result sections (608 and 611) product details including title, thumbnails and product keywords and prices are displayed. The product keywords are chosen based on matching the words in the keyword set to the database of product details provided from the client website. The product keywords may also include synonyms.

In a further section 609, product category specific banners and promotions can be shown. In section 610, location specific data, or any other non-product related yet relevant data, can be shown.

Certain sections within the landing page are used to display permanent data, i.e. data that only requires the data to be stored once in cache as it is not constantly being updated. Other sections within the landing page are used to display dynamic data which is constantly being updated and so needs to be reached. Examples of sections that display permanent data are the sections 603, 604, 605, 606, 609, 610, 611 and 612. Examples of sections that display dynamic data are sections 607, 608 and 611.

The herein described systems and methods therefore address specific issues such as, for example:
  presenting closer matching product content to user search queries on SEM keyword-level landing pages, therefore allowing the user to find the products they are actively searching for, easier, leading to higher expected SEM traffic conversion rates;
  making SEM keyword-level landing page generation scalable, by automating the process and enabling the launch and update of $100s$ of $1000s$ keyword-level pages with the herein described system;
  enabling the inclusion at scale of highly relevant, non-product associated content from within the client's content as well as from external sources, to further increase user search query relevance and therefore conversion rates;
  generating an as-close-as-possible match of landing page content to SEM keyword for SEM platforms, such as Google AdWords™, which typically rewards this close match by assigning a higher 'Landing page quality score' that leads to lower Cost-per-Click for the same advert position, or a higher position for the same Cost-per-Click in the SEM auction;
  further enhancing SEM campaigns and reducing campaign management resource requirements, by automatically identifying highly relevant user search queries that are currently not included in the keyword list, automatically creating the relevant landing page and uploading the new keyword and landing page combinations into the SEM campaign;
  decoupling website structure and SEM account structure, therefore optimizing SEM campaigns beyond the limitations of the existing web pages, and doing this without altering the user experience, or internal search experience, of the existing website; and
  improving user experience for users performing searches on the search engine due to lower user bounce rates, higher conversion rates etc.

The system described herein presents these different aspects of the content on the website to the search engine, by:
  A) Storing the website product and/or content feed in an external system's database 211. This database is updated whenever the website's product and/or content feed is updated in the client product database 206 to ensure freshness of the content.
  B) Creating a landing page template that matches, or at least partially or closely matches, the existing client web pages in terms of header, footer, menus and design/CSS.
  C) Importing SEM keywords from SEM campaigns associated with the website.

D) Identifying additional, non-product associated content that is relevant for the SEM keywords, importing and structuring this data.
E) Producing a SEM keyword-level landing page from the product and/or content feed in the system's database and displaying the most relevant keyword set matching items from the product and/or content feed on each of these landing pages.
F) Testing if an SEM keyword includes a relevancy trigger for non-product associated content for the keywords in the target keyword sets, and if this is the case, adding non-product associated relevant content to the keyword-level landing page.
G) Hosting and caching these landing pages on the system's servers.
H) Displaying this content to users, but not search engines, under the website's subdomain or under a subdirectory of the website's main domain.
I) Continuously testing if SEM search queries are not included in the SEM keywords list, testing for relevancy and quality thresholds and, if these thresholds are passed, producing a new landing page plus keyword combination that is automatically added to the relevant SEM campaign.

Therefore the systems, modules and methods described herein enable the generation of keyword-level landing pages for paid search campaigns in order to improve content relevance for each individual keyword, therefore improving SEM traffic conversion rates, SEM landing pages quality score and decreasing cost-per-acquisition in SEM, associated with a website.

It will be understood that landing pages may be generated for a cluster of keywords (e.g. 100 new landing pages for 1,000 keywords) using the herein described system. For example, the system may build a landing page template, receive product/content feed from a website, search against or compare with keywords against the index of that product feed to produce product results landing pages. The system may identify that 10 keyword variations can be associated with the same landing page.

It will be understood that separate landing pages may be generated for each of multiple keywords in a set of campaign defined terms, a sub-set of keywords in a set of campaign defined terms, all keywords in a set of campaign defined terms or a defined cluster of keywords in a set of campaign defined terms. For example, there may be a 1-to-1 or many-to-1 keyword to landing page relationship.

It will be understood that the embodiments of the present invention described herein are by way of example only, and that various changes and modifications may be made without departing from the scope of invention.

INDUSTRIAL APPLICABILITY

The arrangements described are applicable to the computer and data processing industries and particularly for the landing page optimisation industries.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The invention claimed is:

1. A system for generating keyword-level landing pages for paid search campaigns associated with website content on a website, the system comprising:
   a processor; and
   a memory device having stored therein a plurality of instructions that, when executed by the processor, cause the system to execute:
   a keyword list management module adapted to:
      receive a set of campaign defined terms, wherein the set of campaign defined terms comprises a plurality of phrases that are actively targeted as SEM keywords in an SEM campaign;
   a website content gathering module adapted to:
      receive website content data associated with the website content;
   a landing page generating module adapted to:
      retrieve the web site content data from the web site content gathering module and store the retrieved website content data in a website content database of the system;
      generate a search index based on the retrieved website content data in the website content database of the system;
      generate a plurality of landing pages based on the received campaign defined terms and the retrieved website content data that is stored in the website content database, wherein to generate the plurality of landing pages comprises to, for each campaign defined term, (i) search the retrieved website content data for the campaign defined term with the search index to determine internal search results, (ii) generate a landing page for the campaign defined term that includes the internal search results, and (iii) store the landing page for the campaign defined term at a predetermined web address associated with the landing page; and
      communicate with a publicly visible web page server that is external to the website and has access to the website content database of the system to enable the publicly visible web page server to store and serve the generated landing pages stored in the website content database, wherein the web page server publishes the generated landing pages onto a client sub domain URL pointing to an IP address of the web page server, or onto a client subdirectory URL via a reverse proxy URL rewrite.

2. The system of claim 1, wherein the set of campaign defined terms comprises one or more keyword lists and/or one or more user search query lists from an SEM account, and
   wherein a user search query in the user search query list can be actively targeted by an exact match SEM keyword, or it can be triggered via phrase or broad matching targeted keywords by the SEM platform.

3. The system of claim 2, wherein the system is arranged to retrieve the campaign defined terms from one of an SEM platform API, manual upload or from a referrer URL.

4. The system of claim 3, wherein the campaign defined terms comprise a plurality of keywords, where each of the plurality of keywords is a single keyword or a key phrase comprised of more than one word, and
   wherein the campaign defined terms comprise a plurality of user search queries and each user search query comprises a single keyword or a key phrase comprised of more than one word.

5. The system of claim 1, wherein the website content gathering module is further adapted to receive external content associated with the website content.

6. The system of claim 1 further comprising a publicly visible web page server adapted to store and serve the generated landing pages.

7. The system of claim 1, wherein the keyword list management module is further adapted to categorise SEM keyword sets based on descriptors associated with the website content data, or the keyword list management module is further adapted to associate descriptors that are based on the website content data with the target keyword sets, or the keyword list management module is the keyword list management module is further adapted to define one or more of: keyword to content relationships; synonyms; stop words; matching algorithms; ranking algorithms; content update/re-cache frequency.

8. The system of claim 1, wherein the website content data comprises product and/or service data associated with the content on the website.

9. The system of claim 1, wherein the web page generating module is further adapted to generate landing pages by defining a unique resource locator for each landing page, where the unique resource locator comprises at least a subset of all keywords from the campaign defined terms and a link to the publicly visible web page server, or the web page generating module is further adapted to generate landing pages with one or more of: hyperlinks to other generated landing pages; dynamic data based on the web site content; a hyperlink to the web site.

10. The system of claim 1, wherein the keyword list management module is further adapted to identify if a search query combination has not previously been used as a keyword combination.

11. A method for generating keyword-level landing pages for paid search campaigns associated with website content on a website, the method comprising the steps of:
receiving a set of campaign defined terms, wherein the set of campaign defined terms comprises a plurality of phrases that are actively targeted as SEM keywords in an SEM campaign,
defining keyword-content relationships based on the website content,
receiving website content data associated with the website content,
retrieving the web site content data,
storing the retrieved website content data in a website content database,
generating a search index based on the retrieved website content data in the website content database,
generating a plurality of landing pages based on the received campaign defined terms and the retrieved website content data that is stored in the website content database, wherein generating the plurality of landing pages comprises, for each campaign defined term, searching the retrieved website content data for the campaign defined term with the search index to determine internal search results, generating a landing page for the campaign defined term that includes the internal search results, and storing the landing page for the campaign defined term at a predetermined web address associated with the landing page,
communicating with a publicly visible web page server that is external to the website and has access to the website content database to enable the publicly visible web page server to store and serve the generated landing pages stored in the website content database, and
publishing the generated landing pages onto a client sub domain URL pointing to an IP address of the web page server, or onto a client subdirectory URL via a reverse proxy URL rewrite.

12. The method of claim 11, wherein the set of campaign defined terms comprises one or more keyword lists and/or one or more user search query lists from an SEM account, and wherein a user search query in the user search query list can be actively targeted by an exact match SEM keyword, or it can be triggered via phrase or broad matching targeted keywords by the SEM platform.

13. The method of claim 12, wherein the method further comprises the step of retrieving the campaign defined terms from one of an SEM platform API, manual upload or from a referrer URL.

14. The method of claim 11, wherein the campaign defined terms comprise a plurality of keywords, where each of the plurality of keywords is a single keyword or a key phrase comprised of more than one word, or the campaign defined terms comprise a plurality of user search queries and each user search query comprises a single keyword or a key phrase comprised of more than one word.

15. The method of claim 11, wherein the method further comprises the step of receiving external content associated with the web site content.

16. The method of claim 11 wherein the method further comprises the steps of storing and serving the generated landing pages.

17. The method of claim 11, wherein the method further comprises the step of categorising SEM keyword sets based on descriptors associated with the website content data.

18. The method of claim 11, wherein the method further comprises the step of associating descriptors that are based on the web site content data with the target keyword sets.

19. The method of claim 11, wherein the method further comprises the step of defining one or more of: keyword to content relationships; synonyms; stop words; matching algorithms; ranking algorithms; content update/re-cache frequency.

20. The method of claim 11, wherein the website content data comprises product and/or service data associated with the content on the web site.

21. The method of claim 11, wherein the method further comprises the step of generating landing pages by defining a unique resource locator for each landing page, where the unique resource locator comprises at least a subset of all keywords from the campaign defined terms and a link to the publicly visible web page server, or wherein the method further comprises the step of generating landing pages with one or more of: hyperlinks to other generated landing pages; dynamic data based on the website content; a hyperlink to the website.

22. A server comprising a processor and a memory arranged to perform the steps defined in the method of claim 11.

* * * * *